Reissued June 30, 1953

Re. 23,676

UNITED STATES PATENT OFFICE 23,676

METHOD OF PROCESSING SOLVENT-EXTRACTED LUBRICATING OIL BY TREATING WITH PHOSPHORUS PENTASULFIDE AND A BASE AND THE RESULTING PRODUCTS

John D. Bartleson, Beachwood Village, Ohio, assignor to The Standard Oil Company, Cleveland, Ohio, a corporation of Ohio No Drawing. Original No. 2,560,546, dated July 17, 1951, Serial No. 30,206, May 29, 1948. Application for reissue June 10, 1952, Serial No. 292,778

10 Claims. (Cl. 252—32.7)

Matter enclosed in heavy brackets [ ] appears in the original patent but forms no part of this reissue specification; matter printed in italics indicates the additions made by reissue.

This invention relates to processes of improving hydrocarbon base lubricants, and more particularly to the treatment of hydrocarbon lubricants with a small amount of phosphorus pentasulfide followed by the treatment thereof with a base, especially a metal base, to form lubricants having improved properties, especially as to corrosion, lacquer, sludge, viscosity increase, and the like characteristics. It also relates to the resulting improved lubricants, especially those having an ash content.

Many of the commercially used lubricants are formed from hydrocarbon base stocks, which may be synthetically prepared or which may be derived from natural sources, such as petroleum. For many purposes so-called "additives" must be included with the hydrocarbon base stock in order to provide a lubricant having desirable characteristics, particularly detergency. The solvent extracted oils, for example, are notably corrosive and if this is to be cured and detergency imparted, two additives or a multifunctional additive is required. Generally, the addition of these additives is associated with a higher cost of the finished lubricant. The preparation of a finished lubricant directly from hydrocarbon base stock by chemical finishing or refining the entire stock to provide the wanted properties at a commercially interesting cost has been a particularly baffling problem to the art.

In accordance with the invention, it has been found that a solvent-refined hydrocarbon lubricating oil stock may be reacted with a small amount of phosphorus pentasulfide, and then with a base, and the resulting reaction product is an improved lubricant; i. e., a chemically finished or refined lubricant. Such lubricants are suitable for use under various conditions, including high temperatures or high pressures or both; as, for instance, use in an internal combustion engine operating at high temperatures and in which the lubricant is in close contact with metallic surfaces, metal compounds and high temperature gases. They are also suitable for use in extreme pressure lubricants, e. g., in oils and greases containing the same.

The reaction of the solvent-refined hydrocarbon base stock with the phosphorus pentasulfide may be conducted with direct admixture of the reactants, or, if desired, by their admixture in the presence of a diluent which may be subsequently removed. Generally a diluent is not necessary. The reaction is usually complete in about 10 hours or less time, generally 1 to 2 hours. The reaction time is a function of the temperature, the amount of sulfide that is to react, the subdivision of the reactants, the efficiency of mixing the reactants, and the like.

The solvent-refined hydrocarbon lubricant stock is reacted with the phosphorus pentasulfide in a ratio of from about 0.1 to about 0.75% by weight, based on the weight of the hydrocarbon lubricating base stock, desirably about 0.25 to about 0.60%, and preferably about 0.35 to about 0.5%. Higher amounts of the pentasulfide give products which are inferior to the hydrocarbon as to viscosity increase. Generally, at least about 0.1% thereof should be used to achieve the desired result, although smaller amounts show some improvement.

The refining of the solvent-refined hydrocarbon stock with the phosphorus pentasulfide may be carried out in the presence or absence of air, or in an atmosphere of inert or non-deleterious gas, such as nitrogen or $H_2S$. It may also be carried out under pressure, e. g., pressure generated when the reaction is carried out in a closed vessel.

The refining temperature varies with the hydrocarbon stock. Generally, the temperature of the reaction, or of subsequent treatment, should be at least 275° F., but should be below the temperature at which the reaction product would be decomposed. A temperature in the range of about 300 to about 450° F. is preferred in many cases. The final refined oil is preferably centrifuged or filtered to remove any by-products, sludge, or other by-product material. If a volatile diluent is used, it may be removed by evaporation.

The sulfide refined oil stock is treated with a base derivative, such as a metal compound. The metal derivatives may be formed from one or more metal compounds, such as their sulfides, oxides, hydroxides, carbides and cyanamides. The preferred metals are group I, group II and group III metals of the periodic table, such as potassium, zinc, barium and aluminum, especially the alkali and alkaline earth metals. For particular services, the heavier metals have particular use, i. e., those below zinc in the electromotive series, such as chromium, cadmium, tin, lead, antimony, bismuth, arsenic, and the like.

In the treatment with the base derivatives, the treating step may be carried out at temperatures in the range of about 100° to about 350° F., a temperature in the range of about 180° to 250° F. being preferred, if the sulfide refined stock has been subjected to a temperature of at least 300° F. Alternatively, the derivative may be prepared at or subjected to this temperature.

From about 0.25 to about [0.6] *6.0* equivalents of the metal compound may be used per mol of the sulfide used in the sulfide refined stock, preferably about 1.0 to about 3.0 equivalents. An equivalent is the quotient of a mol divided by the valence of the metal concerned.

The hydrocarbon lubricant stock to which the process is applied is a solvent-extracted or solvent refined oil, i. e., oils treated in accordance with conventional modern methods of solvent refining lubricating oils. The oil may be a fluid hydrocarbon lubricating base stock having a viscosity at 100° F. to 10 to 500 centistokes, such as used as the base for the S. A. E. 10 to 50 oils. It may be obtained as a distillate or from synthetic material, such as petroleum, and oils produced by cracking, polymerization, hydrogenation, and the like mthods. The solvent refining process is well-known, and generally involves a physical separation. Usually, the solvent selected, such as furfural, phenol, sulfur dioxide, etc., dissolves such constitutents as aromatic, unsaturated, and low viscosity index materials, and these are separated out. A clay treatment may or may not follow and is desirable but not essential. Where necessary, a separate propane or the like deasphalting treatment may be used in connection with the solvent refining.

In order to illustrate and point out some of the advantages of the invention, but in no sense as a limitation thereof, the following specific embodiments are included.

In these examples, the hydrocarbon stock is a conventional solvent-extracted or refined lubricating oil base stock, prepared by solvent extracting the raw lubricating oil, and then treating the solvent extracted oil with 8 lbs. of clay per barrel of oil, in a conventional manner. This is a good grade of solvent refined oil available on the market and is typical of such an oil.

The phosphorus pentasulfide is mixed with the hydrocarbon lubricating oil, in the amounts indicated in the following table, and agitated for 1 hour at 300° F. at atmospheric pressure. Then it is mixed with the amount and kind of base indicated in the following table, and agitated for 2 hours at 250° F. and at atmospheric pressure. The base used for convenience is in anhydrous form, but may be in aqueous solution if desired. A good yield is obtained, base on the hydrocarbon lubricating oil, and no sludge is formed; but it is preferred to filter the reaction product. The reaction product is identified hereinafter by the example number.

| Example Number | Amount of $P_2S_5$ in Per Cent by Weight of Hydrocarbon | Amount of Base (Relative to Weight of Hydrocarbon) | Ash |
|---|---|---|---|
| | | | Percent |
| 1 | 0.4 | 0.2% KOH | 0.27 |
| 2 | 0.4 | 0.4% KOH | 0.30 |
| 3 | 0.4 | 0.6% KOH | 0.49 |
| 4 | 0.4 | 0.8% KOH | 0.40 |
| 5 | 0.4 | 0.6% $Ba(OH)_2$ | 0.026 |
| 6 | 0.4 | 0.16% $Be(OH)_2$ | 0.097 |
| 7 | 0.4 | 0.17% $Li(OH)_2$ | 0.105 |
| 8 | 0.4 | 0.29% NaOH | 0.14 |
| 9 | 0.4 | 0.2% $Al_2O_3.H_2O$ | 0.025 |

*In Example 4, the amount of potassium hydroxide is 0.8 equivalents per mol of the phosphorus pentasulfide.*

The "Sohio" corrosion test was used in evaluating lubricants made in accordance with the invention. This test is described in a co-pending application of E. C. Hughes, J. D. Bartleson, M. L. Sunday and M. M. Fink, which also correlates the results of the laboratory tests with a Chevrolet engine test.

Essentially the laboratory test equipment consists of a vertical thermostatically heated glass test tube (45 mm. outside diameter and 42 cm. long), into which is placed the corrosion test unit. An air inlet is provided for admitting air into the lower end of the corrosion unit in such a way that in rising the air will cause the oil and suspended material therein to circulate into the corrosion unit. The tube is filled with an amount of the oil to be tested which is at least sufficient to submerge the metals being tested.

The corrosion test unit essentially consists in a circular relatively fine grained copper-lead test piece of 1/16" O. D., which has a 1/4" diameter hole in its center (i. e., shaped like an ordinary washer). The test piece has an exposed copper-lead surface of 3.00 sq. cm. Of this surface area, 1.85 sq. cm. acts as a loaded bearing, and is contacted by a part of the cylindrical surface of a hardened steel drill rod (14" diameter and 3 1/32" long, and of 51–57 Rockwell hardness).

The drill rod is held in a special holder, and the holder is rotated so that the surface of the drill rod which contacts the bearing sweeps the bearing surface (the drill rod is not rotated on its own axis and the surface of the drill rod which contacts the bearing is not changed).

The corrosion test unit means for holding the bearing and the drill rod is a steel tubing (15" long and 1 3/32" O. D.) which is attached to a support. A steel cup (1" long, 1 3/32" O. D. by 1/16" I. D.) is threaded into the steel tube, at the lower end. The cup has a 3/8" diameter hole in the bottom for admitting the oil into the corrosion chamber. The copper-lead test piece fits snugly into the steel cup and the hole in the test piece fits over the hole in the steel cup. A section of steel rod (3/8" in diameter and 19" long) serves as a shaft and is positioned by 2 bearings which are fixedly set in the outer steel tubing, one near the top and one near the lower (threaded) end thereof. Several holes are drilled just above and just below the lower bearing. The holes above the bearing facilitate cleaning the apparatus, while the holes below the bearing enable the circulation of oil through the corrosion chamber. The drill rod holder is connected to the shaft by a self-aligning yoke and pin coupling. This assures instantaneous and continuous alignment of the drill rod bearing member against the bearing surface at all times. A pulley is fitted to the top of the steel shaft and the shaft is connected therethrough to a power source. The shaft is rotated at about 675 R. P. M.; and the weight of the shaft and attached members is about 600 grams, which is the gravitational force which represents the thrust on the bearing. The air lift from the air inlet pumps the oil through the chamber containing the test piece and out through the holes in the steel tubing.

The ratios of surface active metals to the volume of oil in an internal combustion test engine are nearly quantitatively duplicated in the test equipment. The temperature used is approximately that of the bearing surface. The rate of air flow per volume of oil is adjusted to the same as the average for a test engine in operation. Of the catalytic effects, those due to soluble iron are the most important. They are empirically duplicated by the addition of a soluble iron salt. Those due to lead-bromide are duplicated by its addition.

The test was correlated with the L-4 Chevrolet test, and a slightly modified version thereof. The modified test comprised reducing the oil additions from the 4 quarts in the usual procedure to 2 quarts, by reducing the usual 1 pint oil additions which are made at 4 hour intervals to ½ pint additions. This modification increases the severity of the test in its corrosion and detergency components, particularly in the case of border line oils.

For each test, the glass parts are cleaned by the usual chromic acid method, rinsed and dried. The metal parts are washed with chloroform and carbon disulfide and polished with No. 925 emery cloth or steel wool. A new copper-lead test piece is used for every test. The test piece is polished before use, on a surface grinder to give it a smooth finish. The test piece is weighed before and after the test on an analytical balance to evaluate the corrosion. After placing the oil and corrosion test unit in the tube, and bringing the assembly up to temperature in the thermostat, soluble catalyst is added and the air flow is started. Lead-bromide catalyst is added immediately after starting the air, and timing of the test is begun.

The laboratory test conditions which were found to correlate with the Chevrolet procedure 36-hour test are shown in the following table:

TABLE A

Temperature—325° F.
Oil sample—107 cc.
Air flow rate—70 liters/hour
Time—10 hours
Catalyst—Steel; copper-lead bearing: 3 sq. cm. area of which 1.85 sq. cm. is a bearing surface; ferric 2-ethyl hexoate: 0.05% as $Fe_2O_3$ in C. P. benzene; lead bromide: 0.1% as precipitated powder.
Bearing assembly:
Load ..... grams.. 600
Speed ..... R. P. M.. 675

By extending the laboratory test to 20 hours, it was found that correlation with the Chevrolet 72-hour test could be obtained.

At the close of the test period, the extent of corrosion is determined by reweighing the corrosion test piece and determining the change in weight due to the test. An accurate evaluation of the lacquering properties of an oil is obtained by a visual rating system which is applied to the outer surface of the corrosion unit steel tube and metal cup in much the same way that the piston skirt, cylinder wall, etc., of an engine are rated for varnishes. The sludge rating of the engine is simulated by a visual rating of the insoluble materials and used oil which are coated on the glass test tube at the conclusion of the test. For both sludge and varnish rating a scale rating of A (best) to F (worst) is used.

A sufficient volume of used oil is obtained from the test for determination of the usual used oil properties, such as pentane insolubles (sludge), viscosity increase, neutralization number and optical density.

The data in the following tables typify the results obtained in 20-hour "Sohio" corrosion tests on the hydrocarbon lubricating oil base stock, and the improved lubricants prepared therefrom in accordance with the invention.

Table I

| Lubricant—Example No. | S. E. Oil (blank) | 1 | 2 | 3 | 4 |
|---|---|---|---|---|---|
| Corrosion of Cu-Pb (in mgms. wt. loss of) | 40.1 | 3.5 | 16.3 | 13.3 | 6.8 |
| Viscosity Increase (SUS) | 4,070 | 19 | 152 | 72 | 108 |
| Pentane Insolubles (in mgm./10 g. of lubricant) | 25.8 | 5.0 | 2.6 | 9.5 | 8.9 |
| Acid Number | 11.3 | 0.7 | 1.9 | 0.71 | 1.0 |
| Sludge Rating | A− | A+ | A− | A+ | A+ |
| Lacquer Rating | A | A | A+ | A | A− |

Table II

| Lubricant—Example No. | S. E. Oil blank) | 5 | 6 | 7 | 8 | 9 |
|---|---|---|---|---|---|---|
| Corrosion of Cu-Pb (in mgms. wt. loss of) | 40.1 | 39.7 | 19.5 | 12.5 | 9.9 | 41.0 |
| Viscosity Increase (SUS) | 4,070 | 464 | 218 | 163 | 149 | 947 |
| Pentane Insolubles (in mgm./10 g. of lubricant) | 25.8 | 1.66 | 1.01 | 1.04 | 0.24 | 4.63 |
| Acid Number | 11.3 | 1.5 | 1.6 | 2.6 | 1.1 | 3.2 |
| Sludge Rating | A− | A− | A− | A− | A | B |
| Lacquer Rating | A | C | C | C− | C− | C |

The ash content is important in these lubricants, since it is associated with good detergency. As to this feature, the ratio of the sulfide to the base used in Example 3 is particularly advantageous.

In preparing the metal derivative of Example 1, the base is used in dry form. In a similar run, except using the same amount of base in aqueous solution, a desirable lubricant is obtained. However, the lubricant of Example 1 shows better corrosion, viscosity increase, acid number, sludge and optical density characteristics. This indicates that an aqueous base may be used but that a dry base is much to be preferred.

In runs comparable to those of the foregoing examples, except using 0.4% and 0.1%, respectively, of $P_4S_3$ as the sulfide, it is found that the treatment with the base has the effect of taking substantially all the $P_4S_3$ out of the oil, i. e., giving a product of substantially zero ash content.

In a run similar to Example 2, except using raw #300 Red Oil (a conventional Mid-Continent lubricating oil stock, of 20–30 S. A. E. viscosity), a product having an ash content of 0.22% is obtained. It is inferior to the Example 2 reaction product as to corrosion, viscosity increase, acid number, pentane insolubles, sludge, and lacquer characteristics. This indicates that for the requisite detergency, the oil should be solvent refined before treatment with phosphorus sulfide.

The 36-hour L-4 Chevrolet engine test was also used in comparing the oils of Examples 3 and 4. In this test, new piston rings and two new copper-lead bearing inserts are installed in the motor prior to each test. The engine is a conventional Chevrolet engine with 216.5 cu. in. piston displacement and a compression ratio of 6.5 to 1. The engine is operated at 3150 R. P. M. with a load of 30 B. H. P. and at a temperature at the jacket outlet of 200° F. The lubricating oil temperature is maintained at 265° F. for an S. A. E. 10 grade oil, and at 280° F. for oils of S. A. E. 30 to 50 grades. The fuel used contains from 2.5 to 3.0 ml. tetra-ethyl lead per gallon. Besides the weight loss of the test bearings, deposits in the power section, and properties of the used oil, sampled near the middle and also at the end of the test, are examined. The following results were obtained:

Table III

| Lubricant—Example No. | S. E. Oil | 3 | 4 |
|---|---|---|---|
| Overall Rating | 92.00 | 94.00 | 92.00 |
| Bearing Corrosion (mgms./bearing half-shell) | 1,428 | 174 | 130.5 |
| Viscosity Increase (SUS) | 210 | −22 | 35 |
| Pentane Insolubles (in percent by weight) | 1.10 | 1.01 | 0.94 |
| Acid number | 2.4 | 0.68 | 0.58 |

These Table III Chevrolet test data also show that the amount of the metal is not particularly critical and further tests show that increasing the amount of metal does not have any effect (good or bad) on the oil. Other tests show that the amount of $P_2S_5$ used in the examples is optimum and amounts above and below this within the range disclosed heretofore, while yielding an improvement on the untreated oil gives somewhat higher corrosion and viscosity increase than the optimum.

The greatly improved corrosion characteristic in the chemically refined or finished lubricants, particularly with detergency, is especially noteworthy, since this is a major problem with conventional solvent refined oils.

By comparable procedures, using any known comparable phosphorus sulfide, or any amount of phosphorus sulfide, or any hydrocarbon lubricating oil stock, coming within the board types and ranges as indicated hereinbefore, comparable improved lubricants are obtained.

If desired, the improved lubricants of the invention may be used in blends together with other lubricants or lubricant agents, e. g., with soap or the like in a grease. If desired, an agent for improving the clarity of the oil may be included, e. g., lecithin, lauryl alcohol, and the like. If desired, an agent for preventing foaming may be included, e. g., tetra-amyl silicate, an alkyl ortho-carbonate, ortho-formate or ortho-acetate, or a polyalkyl silicone oil.

In view of the foregoing disclosure, variations and modifications of the invention will be apparent to those skilled in the art, and it is intended to claim such variations and modifications broadly, except as do not come within the scope of the appended claims.

I claim:

1. A method of processing solvent-extracted lubricating oil stock consisting essentially of hydrocarbon material to yield an oil having improved inhibition to oxidation in service, which method comprises treating said stock with an amount of phosphorus pentasulfide in the range of about 0.1 to about 0.75% by weight at a temperature in the range of about 275° to 450° F., and then with an amount of a base in range of about 0.25 to 6.0 equivalents per mol of the phosphorus pentasulfide.

2. The method of claim 1 wherein the stock is treated with an amount of phosphorus pentasulfide in the range of about 0.25 to about 0.6% at a temperature in the range of about 300° to 450° F., and then with an amount of a metal base in the range of about 1.0 to about 6.0 equivalents per mol of the phosphorus pentasulfide.

3. The method of claim 2 wherein the stock is treated with an amount of phosphorus pentasulfide in the range of about 0.35 to about 0.5%, and then with an amount of potassium hydroxide in the range of about 1 to about 3.0 equivalents per mol of the phosphorus pentasufide.

[4. The method of claim 3 wherein the stock is a clay-treated stock, and wherein said stock is treated with about 0.4% of phosphorus pentasulfide, and then with an amount of dry potassium hydroxide in the range of about 0.6 to about 0.8% by weight of the stock.]

5. A lubricant obtained by the process of claim 1.

6. A lubricant obtained by the process of claim 2.

7. A lubricant obtained by the process of claim 3.

[8. A lubricant obtained by the process of claim 4.]

*9. A method of processing solvent extracted lubricating oil stock consisting essentially of hydrocarbon material to yield an oil having improved inhibition to oxidation in service which method comprises treating said stock with an amount of phosphorus pentasulfide in the range of about 0.1 to about 0.75% by weight at a temperature in the range of about 275° to 450° F. and then with potassium hydroxide in the amount of at least about 0.25 equivalent up to 8.0 equivalents per mol of the phosphorus pentasulfide.*

*10. A lubricant obtained by the process of claim 9.*

*11. The method of claim 9 wherein the stock is treated with an amount of phosphorus pentasulfide in the range of about 0.25 to about 0.6% at a temperature in the range of about 300 to 450° F. and then with an amount of dry potassium hydroxide in the range of about 0.6 to about 0.8% by weight of the stock.*

*12. A lubricant obtained by the process of claim 11.*

JOHN D. BARTLESON.

References Cited in the file of this patent or the original patent

UNITED STATES PATENTS

| Number | Name | Date |
|---|---|---|
| 2,316,091 | White | Apr. 6, 1943 |
| 2,393,335 | Musselman | Jan. 22, 1946 |
| 2,398,429 | Hughes | Apr. 16, 1946 |
| 2,419,584 | Noland | Apr. 29, 1947 |

Certificate of Correction

Reissue No. 23,676 June 30, 1953

JOHN D. BARTLESON

It is hereby certified that error appears in the printed specification of the above numbered patent requiring correction as follows:

Column 3, line 19, for "to", first occurrence, read of ; line 56, for "base" read based ; column 4, line 2, for "*0.8*" read *8.0*; column 7, line 36, for "board" read broad ; column 8, line 2, before "range" insert the ;

and that the said Letters Patent should be read as corrected above, so that the same may conform to the record of the case in the Patent Office.

Signed and sealed this 8th day of September, A. D. 1953.

[SEAL]

ARTHUR W. CROCKER,
*Assistant Commissioner of Patents.*